United States Patent Office 3,493,633
Patented Feb. 3, 1970

3,493,633
PRODUCTION OF DYED POLYAMIDE FILAMENTS CONTAINING A PHENOLIC ANTIOXIDANT
Ronald Frederick Lange, Wilmington, Del., assignor to E. I. du Pont de Nemours and Company, Wilmington, Del., a corporation of Delaware
No Drawing. Continuation-in-part of application Ser. No. 664,235, Aug. 28, 1967. This application Aug. 13, 1968, Ser. No. 752,146
Int. Cl. C08g 51/58
U.S. Cl. 260—857                    14 Claims

ABSTRACT OF THE DISCLOSURE

An improvement in the process for producing dyed fibers of a synthetic, linear, fiber-forming polycarbonamide polymer, which process includes polymerizing prepolymer reactants to form the polycarbonamide, melt spinning the polycarbonamide to form filaments, and dyeing the filaments; the improvement for producing dyed fibers having a substantially improved protection against heat and light wherein the improvement comprises adding to the polycarbonamide prior to melt spinning from about 0.05% to about 5% by weight of at least one phenolic compound selected from the class consisting of (a) a 1,3,5 - trialkyl - 2,4,6 - tri - (3,5 - di - tertiary - alkyl-4-hydroxybenzyl) benzene, and (b) a 2,3,5,6-tetraalkyl-1,4-di-(3,5-di-tertiary-alkyl-4-hydroxy-benzyl) benzene.

CROSS REFERENCES TO RELATED APPLICATIONS

This application is a continuation-in-part of my copending application Ser. No. 363,636, filed Apr. 29, 1964, now abandoned and Ser. No. 664,235 filed Aug. 28, 1967, now abandoned.

BACKGROUND OF THE INVENTION

Field of the invention

This invention pertains to stabilized synthetic, fiber-forming polycarbonamides and more particularly to novel polycarbonamide compositions containing phenolic antioxidants.

Description of the prior art

The performance of synthetic, fiber-forming polycarbonamides, commonly referred to as nylon, exposed to heat and light can be improved by the incorporation of antioxidants. The incorporation of antioxidants during polymerization can improve polymer whiteness and whiteness retention upon exposure to heat as shown for example in U.S. 2,981,715 in which sodium phenyl phosphinate is a preferred specie. However, such antioxidants, though effective under the polymerization and fiber melt-spinning conditions, are readily extractable from the resulting fibers under normal aqueous scouring conditions employed during the processing and use of such fibers. Consequently, they provide no protection to the fibers after dyeing. On the other hand, phenolic antioxidants such as 2,6-di-tertiarybutyl-4-methylphenol are known polycarbonamide antioxidants but they are not sufficiently thermally stable and permanent to provide satisfactory end-use performance when incorporated in the polycarbonamide during polymerization.

The discovery of antistatic synthetic polycarbonamide fibers which contain a poly(alkylene oxide) ether phase dispersed in the polymer, as shown for example in Belgian Patent 623,762, has increased the potential of these fibers in textile applications. Unfortunately, the inclusion of the poly(alkylene oxide) compounds greatly decreases the resistance of these dyed fibers to fading when subjected to light or heat. For example, acid and premetallized acid dyes, which are quite satisfactory for use on unmodified polycarbonamide fibers, give very unsatisfactory dyelightfastness in the modified fibers. This deficiency is particularly serious in carpets which must be heated when the latex binder is cured and in fabrics which must be heatset.

Therefore, an object of this invention is stabilized, synthetic, fiber-forming polycarbonamide compositions having improved permanency of antioxidant protection against heat and light throughout polymerization, fiber-formation, filament processing and end-use.

Another object is such filaments and articles made therefrom having improved resistance to dye fading.

Still another object is such filaments in which the antioxidant can be incorporated during polymerization of the polymer thus eliminating the necessity of any departure from conventional polymerization and filament processing in order to obtain the desired antioxidant protection.

These and other objects will become more apparent in the course of the following specification and claims.

SUMMARY OF THE INVENTION

The process of the invention is defined as an improvement in the process for producing dyed fibers of a synthetic, linear, fiber-forming polycarbonamide polymer, which process includes polymerizing prepolymer reactants to form the polycarbonamide, melt spinning the polycarbonamide to form filaments, and dyeing the filaments; the improvement for producing dyed fibers having a substantially improved protection against heat and light wherein the improvement comprises adding to the polycarbonamide prior to melt spinning from about 0.05% to about 5% by weight of at least one phenolic compound selected from the class consisting of (a) a 1,3,5-trialkyl-2,4,6-tri-(3,5-di-tertiaryalkyl-4-hydroxybenzyl) benzene, and (b) a 2,3,5,6-tetraalkyl-1,4-di-(3,5-di-tertiary-alkyl-4-hydroxy - benzyl) benzene wherein the alkyl groups of (a) and (b) contain up to eight carbon atoms.

In accordance with one embodiment of this invention a novel product is provided comprising a synthetic, linear, fiber-forming polycarbonamide having incorporated therein at least about 0.05% by weight of at least one member selected from the class consisting of (a) a polynuclear polyphenol having a benzene ring substituted with three 3,5-dialkyl-4-hydroxybenzyl radicals and with three alkyl radicals, each of said alkyl radicals having up to eight carbon atoms, and (b) a 1,4-bis(3,5-dialkyl-4-hydroxybenzyl) tetraalkyl benzene, wherein each of the alkyl substituents has up to eight carbon atoms.

Another embodiment of this invention is a synthetic, linear, fiber-forming polycarbonamide having incorporated therein at least 2% by weight of a poly(alkylene oxde) having a molecular weight of at least 600, and at least about 0.05% of a member selected from the class consisting of (a) and (b) noted above. The poly(alkylene oxide) imparts antistatic properties to the fibers of this invention.

The process for preparing the filaments of this invention comprises combining with a synthetic, linear, fiber-forming polycarbonamide at any stage of fiber production prior to melt spinning into fibers, and preferably during polymerization at least 0.05% by weight of at least one member selected from the class consisting of (a) and (b) noted above. The poly(alkylene oxide), when employed, may be added with the phenolic antioxidants or separately.

In the following examples, which are cited to illustrate the invention are not intended to limit the scope thereof in any manner, all percentages and parts-per-million (p.p.m.) are by weight unless otherwise specified. Relative viscosity measurements, where given, are determined according to the method described in U.S. Patent No. 2,385,890.

EXAMPLE I

This example described methods of incorporating the additives of this invention into the nylon polymer.

(A) Addition during polymerization

A conventional evaporator is charged with 71.7 lbs. of a 48.5% hexamethylene diammonium adipate salt solution (nylon 66 salt solution), 14 lbs. of water is evaporated, and the concentrated nylon 66 salt solution added to a conventional polymer autoclave. To the cold clave is added 215 g. (1.5%) of 1,3,5-trimethyl-2,4,6-tri(3,5-di-tertiary-butyl-4-hydroxybenzyl) benzene, heating is begun and at 410° F. high speed agitation is initiated. The polymerization cycle is continued in a conventional manner with a nitrogen sweep until a relative viscosity of about 50 is obtained. Agitation is halted and the polymer extruded and cut into flake in a conventional manner.

The polymer flake is passed into a grid melter, melt spun into filaments and drawn 3.8× according to procedures well known in the art for the preparation of nylon filaments.

For the preparation of antistatic filaments, a poly(ethylene oxide) ether glycol of approximately 20,000 molecular weight is injected into and blended with the molten polymer immediately prior to spinning by known procedures. The injection rate is controlled so as to maintain a level of 5% of the poly(ethylene oxide) ether glycol in the spun polymer.

(B) Flake coating

A wide-mouth jar is charged with 5 lbs. of ⅜ inch poly(hexamethylene adipamide) (66 nylon) polymer flake and 5.7 g. of a poly(ethylene oxide) ether glycol of approximately 20,000 molecular weight. The jar is rotated on rollers for 4 hours to ensure uniform coating. To this is added 34.0 g. of 1,3,5 - trimethyl-2,4,6 - tri-(3,5-di-tertiary-butyl-4-hydroxybenzyl) benzene and the jar rotated for an additional 8 hours. The flake containing the additive coating is then melt spun by conventional techniques.

EXAMPLE II

The following procedures exemplify the manner in which yarns containing filaments of this invention are dyed. Prior to dyeing the filaments are given a conventional detergent scour in boiling water.

(A) Disperse dyes

A stock solution is made consisting of 4,100 ml. distilled water, 0.40 g. of the sodium salt of an unsaturated long-chain alcohol sulfate, 0.40 g. of "Alkanol" HCS, a nonionic wetting-agent sold by the Du Pont Company, and 0.92 g. trisodium phosphate. This stock solution is used in a ratio of 100:1 bath:yarn ratio by weight. Dye solutions containing 1 g. of dye per liter of distilled water are added in various ratios to the stock solution to give the desired shade. Table I–A contains the quantities of dye solution used to produce various shades of 3 g. yarn samples of 66 nylon containing 5% poly(ethylene oxide) ether glycol. The desired quantity of each dye solution is added to 300 ml. of the stock solution followed by a 3 g. yarn sample. The bath is heated to the boiling point over a period of ½ hour, boiling is maintained for one hour, and then the dyed yarn samples are rinsed thoroughly with distilled water.

(B) Premetallized dyes

A stock solution is prepared using 5,300 ml. distilled water, 0.52 g. of the sodium salt of an unsaturated long-chain alcohol sulfate, 0.52 g. leveling salt (an ethylene oxide/propylene oxide condensation product), and 0.75 ml. of concentrated ammonium hydroxide. Quantities of 0.1% by weight dye solutions used for dyeing 3.0 g. yarn samples in 300 g. stock solution to produce various shades is shown in Table I–B.

The 3.0 g. yarn sample comprising 66 nylon containing 5.0% by weight poly(ethylene oxide) ether glycol is added to the cold dye bath along with 3.0 ml. of 1.0% ammonium sulfate. The bath temperature is slowly raised to the boiling point over a ½ hour period, the boiling maintained for 1½ hours, and the dyed yarn samples rinsed thoroughly with distilled water.

TABLE I

| Dye Color Index or Structure | Ml. 0.1% Dye Solution for Mixed Shades | | | |
| --- | --- | --- | --- | --- |
| A. | Tan | Sand | Grey | Green |
| Disperse Yellow 3 | 6.0 | 1.4 | 0.95 | 4.6 |
| 1-amino-4-hydroxy-2-(2-hydroxyethoxy)anthraquinone | 4.2 | 1.4 | 1.10 | 2.2 |
| Disperse Blue 7 | 1.2 | 0.25 | 0.55 | 2.2 |
| Disperse Blue 3 | 1.2 | 0.25 | 0.55 | 0.50 |

| B. | Grey | Sand | Sea Green | Tan | |
| --- | --- | --- | --- | --- | --- |
| Acid Green 25 | 0.95 | 0.55 | 3.0 | 3.3 | 1.1 |
| Acid Orange 64 | 0.45 | 1.8 | 0.05 | 6.3 | 4.8 |
| Acid Red 182 | 1.0 | 1.4 | 0.50 | 1.0 | 2.2 |

EXAMPLE III

This example shows the improvement in deylight-fastness upon the addition of 1,3,5-trimethyl-2,4,6-tri-(3,5 - di-tertiary-butyl-4-hydroxybenzyl) benzene during polymerization of the polycarbonamides in carpets of 66 nylon containing 5.0% poly(ethylene oxide) ether antistat.

Yarns are prepared by the method described in Example I–A, then tufted into carpets and dyed as in Example II. The samples are exposed to a xenon arc Atlas Weatherometer and dye fading is determined subjectively by reference to the Gray Scale on a numerical basis whereby 5 denotes no fading, 0 denotes almost complete loss of color, and intermediate numbers denote intermediate degrees of fading between the extremes. Hyphenated numbers denote values half-way between the couple, e.g., 2–3 denotes a rating of approximately 2.5. A plus (+) or minus (−) after a number indicates addition or subtraction, respectively, of approximately 0.25 from the base number.

TABLE II

| Antioxidant, percent | Atlas Weatherometer Exposure, hrs. | | | | | | | | | | | |
|---|---|---|---|---|---|---|---|---|---|---|---|---|
| | Disperse Dyes | | | | | | Pre-metal Dyes | | | | | |
| | Grey | | Green | | Tan | | Sea | | Green | | Tan | |
| | 80 | 160 | 80 | 160 | 80 | 160 | 80 | 160 | 80 | 160 | 80 | 160 |
| 0 | 2-1 | 0-1 | 3-2 | 2-1 | 2+ | 1+ | 3-2 | 2-1 | 3— | 2— | 3+ | 2 |
| 1.5 | 3-2 | 2-1 | 3 | 2 | 3 | 2 | 4-3 | 3-2 | 4— | 3— | 4— | 3— |
| 3.0 | 2+ | 2-1 | 3— | 2— | 3-2 | 2— | 4— | 3— | 4— | 3— | 4— | 3— |
| 5.0 | 3-2 | 2-1 | 3— | 2— | 3-2 | 2— | 4— | 3— | 4— | 3— | 4-3 | 3— |

EXAMPLE IV

This example shows the improved resistance to thermal dye fading for filaments of 66 nylon containing 1,3,5-trimethyl - 2,4,6-tri-(3,5-di-tertiary-butyl-4-hydroxybenzyl) benzene. Its effectiveness with nylon 66 containing 5.0% poly(ethylene oxide) ether of approximately 20,000 molecular weight is also shown.

The filaments are prepared as described in Example I–A, dyed according to Example II, and made into jute-backed carpet samples by conventional procedures. Dye fading is rated subjectively according to the numerical Gray Rating Scale after exposure in a forced air oven at 300° F. The exposed samples are compared with identically dyed unexposed samples and the results are given in Table III.

The data show that essentially complete thermal protection under test conditions is obtained with 1.5% of the antioxidant in modified as well as unmodified yarns.

TABLE III

| Percent antioxidant | PEO | Heating Time at 300° F. (min.) | | | |
|---|---|---|---|---|---|
| | | Pre-metallized Dyes | | | |
| | | Sand | | Sea | |
| | | 30 | 60 | 30 | 60 |
| 1.5 | 5.0 | 5 | 5-4 | 5 | 5 |
| 0 | 5.0 | 3— | 2— | 3 | 2 |
| | | Disperse Dyes | | | |
| | | Sand | | Sea | |
| | | 30 | 60 | 30 | 60 |
| 1.5 | 5.0 | 5 | 5— | 5 | 5— |
| 0 | 5.0 | 1 | ½-0 | 3-2 | ½-0 |
| 1.5 | 0 | 5 | 5 | 5 | 5 |
| 0 | 0 | 4 | 3+ | 5 | 5-4 |

EXAMPLE V

This example demonstrates the antioxidant effectiveness in reducing dye fading upon exposure to both thermal and ultraviolet light treatments.

Yarns are prepared from 66 nylon yarn containing 5% of a poly(ethylene oxide) ether of approximately 20,000 molecular weight and various levels of the antioxidant 1,3,5 - trimethyl-2,4,6-tri-(3,5-di-t-butyl-4-hydroxybenzyl) benzene and of the U.V. absorber N,N'-bis(o-phenylene-2,1,3 - benzotriazole)-2,2,5,5-tetramethyl adipamide. All yarns contain 0.3% sodium phenyl phosphinate as a nylon polymerization antioxidant. The yarns are dyed according to Example II–B and wrapped in a double layer on cardboard cards for exposure to thermal and xenon arc treatments. The results given in Table IV readily show the effectiveness of the antioxidant with and without the presence of the U.V. screener.

TABLE IV

| Item | Percent antioxidant | Percent U.V. absorber | Gray Rating of Premetallized Dyes | | | | | | | | | |
|---|---|---|---|---|---|---|---|---|---|---|---|---|
| | | | Thermal (30 min. at 300° F.) | | | Thermal Plus U.V. exposure (hrs.) | | | | | | |
| | | | | | | Sea | | Green | | Tan | | |
| | | | Sea | Green | Tan | 80 | 160 | 80 | 160 | 80 | 160 | |
| A | 1.5 | 2.5 | 5 | 5 | 5 | 4— | 3 | 4 | 3+ | 4 | 3+ | |
| B | 1.5 | 0 | 5 | 5 | 5 | 3— | 2+ | 4-3 | 3-2 | 3+ | 3-2 | |
| C | 0 | 2.5 | 2 | 2 | 2 | 0 | 0 | 0 | 0 | 0 | 0 | |

Dyed item B of Table IV is also tested for dye lightfastness, with no prior thermal treatment, upon exposure to Florida sunlight and compared to a dyed control yarn (Item D) prepared in essentially the same manner and containing the same additives except with none of the phenolic antioxidant. The improvement with Item B is shown in Table IVa.

TABLE IVa

| | Gray Rating After Exposure | | | | | |
|---|---|---|---|---|---|---|
| | Dye Shade | | | | | |
| | Sea | | Green | | Tan | |
| | Exposure, hrs. | | | | | |
| | 40 | 80 | 40 | 80 | 40 | 80 |
| Item: | | | | | | |
| B | 3+ | 3-2 | 4-3 | 3— | 4-3 | 3— |
| D | 3— | 1+ | 3— | 2— | 3— | 2-1 |

To determine the permanence of the additives during yarn preparation and processing, the above yarns are analyzed after a conventional detergent scour and also after a scour and mock dyeing operation using the same dyeing conditions but in the absence of any dye. The results are shown in Table IVb.

TABLE IVb

| Added percent antioxidant | Added percent U.V. absorber | Percent Found in Treated Yarn | | | | | |
|---|---|---|---|---|---|---|---|
| | | Scoured | | Scoured, Mock Dyed (Pre-metal) | | Scoured, Mock Dyed (Disperse) | |
| | | Antioxidant | U.V. | Antioxidant | U.V. | Antioxidant | U.V. |
| 1.5 | 0 | 1.3 | 0 | 1.5 | 0 | 1.4 | 0 |
| 0 | 2.5 | 0 | 1.6 | 0 | 0.9 | 0 | 0.7 |
| 1.5 | 2.5 | — | — | 1.5 | 1.0 | 1.5 | 1.0 |

For this data, yarn samples were dissolved in concentrated sulphuric acid. The additive concentrations were determined by comparing the U.V. absorption peaks with normal quantities of the pure additive in sulphuric acid. A peak in the U.V. spectrum at 310 millimicrons was used for determining the concentration of the U.V. absorbing compound. This compound gave no absorption in the visible light region. The antioxidant concentration was determined by its absorption peak in the visible region at 430 millimicrons. The results show that the antioxidant is essentially non-fugitive as it remains in substantially the same concentration as when added initially after being subjected to scouring and dyeing conditions. Thus substantially no loss of the antioxidant has occurred during fiber preparation and processing.

Also, the dyed yarns of Table IV were analyzed for phosphorus content prior to any dye thermal and light stability tests. The results in Table IVc show that whereas about 0.3% sodium phenyl phosphinate had been added as a polymerization antioxidant only trace quantities of phosphorus are present in the scoured and dyed yarns thus demonstrating the fugitive nature of this antioxidant during fiber processing.

TABLE IVc

| | Phosphorus, p.p.m. After Dyeing | | |
|---|---|---|---|
| | U.V. absorber | Sea Green | Tan |
| Antioxidant: | | | |
| 1.5 | 2.5 | 24 | 23 | 29 |
| 1.5 | 0 | 23 | 24 | 28 |
| 0 | 2.5 | 23 | 24 | 28 |

EXAMPLE VI

This example shows the effectiveness of antioxidants of this invention when included in a polycarbonamide containing a poly(ethylene oxide) end-capped with 2,6-di-t-butyl phenol.

A polymer is prepared from bis(4-aminocyclohexyl) methane and dodecanedioic acid in a conventional manner. The polymer is cut into flake, coated with the antioxidant as in Example I–B and spun into filaments. During spinning, 7.5% by weight of a poly(ethylene oxide) of approximately 1,800 molecular weight end-capped with 2,6-di-t-butyl phenol is injected into the polymer melt by known techniques. Dye lightfastness and thermal stability with and without the 1,3,5-trimethyl - 2,4,6-tri - (3,5-di-tertiary-butyl-4-hydroxybenzyl) benzene antioxidant is shown in Table V.

TABLE V

| Percent Additions | | Dye Lightfastness (hrs. exp.) | |
|---|---|---|---|
| | | Premetallized | |
| Antioxidant | PEO * | 80 | 160 |
| 0 | 7.5 | 3 | 3-2 |
| 1.5 | 7.5 | 4+ | 3+ |
| | | Heating (300° F.), Shade Change | |
| | | Premetallized (45 min.) | |
| 0 | 7.5 | 3+ | |
| 1.5 | 7.5 | 5— | |

EXAMPLE VII

The effectiveness of 1,3,5-trimethyl-2,4,6-tri-(3,5-di-tertiary-butyl-4-hydroxybenzyl) benzene on dye lightfastness is compared in nylon 66 fibers containing 5.0% poly(ethylene oxide) with compound shades of level acid and neutral premetallized dyes and a mixture of the two dyes. Gray Rating results after 160 hours exposure to a xenon arc are given in Table VI.

TABLE VI

| | Average Gray Rating (160 hrs.) | | |
|---|---|---|---|
| | Acid | Premetallized | Acid Premetallized |
| Percent antioxidant: | | | |
| 0 | 0.5 | 1.3 | 1.0 |
| 0.5 | 1.5 | 2.4 | 2.0 |
| 1.5 | 1.5 | 2.4 | 2.0 |

EXAMPLE VIII

This example illustrates the use of tetraalkyl-di-(3,5-di-t-alkyl-4-hydroxybenzyl) benzenes as antioxidants in this invention.

A dyed jute-backed carpet containing yarns spun from a melt blend of 66-nylon containing 5% poly(ethylene oxide) having a molecular weight of approximately 20,000, 0.75% by weight 2,3,5,6-tetramethyl-1,4-di(3,5-di-t-butyl - 4 - hydroxybenzyl) benzene, and 0.75% by weight "Tinuvin P," an o-hydroxyphenyl-benzotriazole U.V. absorber sold by Geigy Chemical Company, is prepared. This carpet sample (B), together with a control sample (A) containing neither the antioxidant nor the U.V. absorber, is exposed for 80 hours (equivalent to ca. 40 sun hours) in an Atlas Xenon Weatherometer before and after a simulated finishing treatment comprising heating the samples for 10 minutes in a forced air oven at 275° C. The results with mixed shades of level acid dyes are shown in Table VII.

TABLE VII

| | Gray Rating after 80 hours exposure | | | |
|---|---|---|---|---|
| | Unfinished | | Heat Cured | |
| | Cocoa | Green | Cocoa | Green |
| Item: | | | | |
| A | 2 | 2 | 1 | 1 |
| B | 4-3 | 3+ | 3— | 3 |

EXAMPLE IX

Pre-metallized dyelightfastness is compared on bulked 66-nylon carpet yarns initially containing 5% poly(ethylene oxids) plus several antioxidants. Sodium phenyl phosphinate and 2,6-di-tertiarybutyl-4-methylphenol have little or no effect 1,3,4-trimethyl-2,4,6-tri(3,4-di-tertiarybutyl-4-hydroxybenzyl) bezene is found to provide dye-lightfastness for the modified yarn equivalent to an unmodified 66-nylon yarn (Table V). The antioxidant additives are added during the nylon polymerization stage; the poly(ethylene oxide) is injected prior to spinning.

The PEO modified antistatic control yarn gives an initial color break at approximately 20 Florida sun hours, whereas the yarn with the preferred antioxidant requires approximately 80 Florida sun hours exposure before an equivalent break occurs, a 4-fold improvement. The results are shown in Table VIII.

TABLE VIII

| 66-Nylon Plus PEO Plus Following Additives | | Atlas Xenon Weatherometer Exposure (Hours)[1] | | | | | | | | |
|---|---|---|---|---|---|---|---|---|---|---|
| | Percent Phenolic Antioxidant | Tan | | Gray | | Turquoise | | Green | | Brown | |
| Percent Sodium phenyl phosphinate | | 80 | 160 | 80 | 160 | 80 | 160 | 80 | 160 | 80 | 160 |
| 0.5 | [2]1.5 | 5— | 4 | 5— | 4 | 54.4 | 4-3 | 5— | 4— | 5— | 4 |
| 0 | [2]1.5 | 5-4 | 4— | 4+ | 4-3 | 4+ | 3 | 5-4 | 4-3 | 5-4 | 4-3 |
| 0.5 | 0 | 3+ | 3-2 | 3+ | 2 | 3 | 2 | 3+ | 3-2 | 3+ | 3— |
| 0 | 0 | 3+ | 2 | 3 | 2 | 3— | 2 | 3 | 2 | 3 | 2 |
| 0.5 | [3]1.5 | 3+ | 2 | 3+ | 2 | 3+ | 2 | 3 | 2 | 3 | 2 |
| Unmodified 66-nylon | | 5— | 5-4 | 5— | 4+ | 5-4 | 4— | 5— | 4+ | 5— | 5-4 |

[1] 2 hours=1 Florida sun hour.
[2] 1,3,5-trimethyl-2,4,6-tri-(3,5-di-tertiarybutyl-4-hydroxybenzyl) benzene.
[3] 2,6-di-tertiarybutyl-4-methylphenol.

EXAMPLE X

Poly(hexamethylene adipamide) yarn with 5% poly-(ethylene oxide) glycol ether dispersed therein containing additives as shown in Table IX are acid dyed in the presence of a levelling agent by conventional procedures with two compound dye shades. The dyed yarns are subjected to a mock carpet latex curing treatment by heating 10 minutes at 300° F. prior to exposure in an Atlas Weatherometer. The excellent dye protection afforded by the antioxidant is readily apparent in Table IX.

TABLE IX

| Additives | Gray Rating | |
|---|---|---|
| | Frosted Cocoa | Leaf Green |
| Control | 2–1 | 1+ |
| 0.75% 1,3-trimethyl-2,4,6-tri(3,5-di-t-butyl-4-hydroxybenzyl) benzene | 3+ | 3+ |
| 0.75% 1,3,5-trimethyl-2,4,6-tri-(3,5-di-t-butyl-4-hydroxybenzyl) benzene and 1.0% N,N'-bis[2-(o-phenylene)-2.1-3-benzotriazole]-2,3,5,6-tetramethyl terephathalamide | 4 | 4 |

The antioxidant is incorporated as described in Example I–B. The ultraviolet screener is incorporated by addition to the autoclave prior to polymerization of the poly(hexamethylene adipamide). The screener is prepared in a known manner by reacting a-aminophenyl-2,1,3-benzotriazole with 2,3,5,6-tetramethylterephthaloyl chloride.

The phenolic antioxidants of type (A) noted above are disclosed in U.S. Patent No. 3,026,264. In general, it has been found that the symmetrical hexa-substituted benzenes are the most effective stabilizers as well as being the easiest compounds to prepare. These compounds are the 1,3,5-trialkyl-,2,4,6-tri(3,5-dialkyl-4-hydroxybenzyl) benzenes having the structure

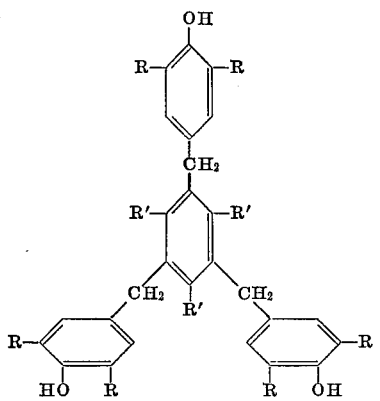

wherein each R and R' is an alkyl group having up to 8 carbon atoms. In the preferred embodiment of these compounds, R' is a lower alkyl radical having from 1 to 4 carbon atoms, and each R is an alkyl radical having from 3 to 8 carbon atoms and is branched on the alpha carbon atom. Such compounds are exemplified by 1,3,5-trimethyl-2,4,6-tri(3,5-diisopropyl-4-hydroxybenzyl) benzene; 1,3,5-triethyl-2,4,6-tri(3,5-di-tert.-amyl-4-hydroxybenzyl) benzene; 1,3,5-tributyl-2,4,6-tri(3-isopropyl-5-tert.-amyl-4-hydroxybenzyl) benzene; and 1,3,5-tripropyl-2,4,5-tri(3,5-di-tert.-octyl-4-hydroxybenzyl) benzene. Of these, the most preferred antioxidant is that class having three 3,5-di-tert.-butyl-4-hydroxybenzyl radicals.

The phenolic antioxidants of type (B) noted above are disclosed in U.S. Patent No. 3,062,895. Such compounds include both the 1,4-bis(3,5-dialkyl-4-hydroxybenzyl) tetraalkyl benzenes represented by the strutcure

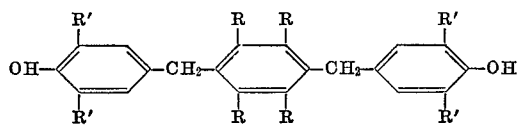

wherein each R and R' is an alkyl radical preferably having up to 8 carbon atoms; and the 1,4-bis(3,5-dialkyl-2-hydroxybenzyl) tetraalkyl benzenes represented by the structure

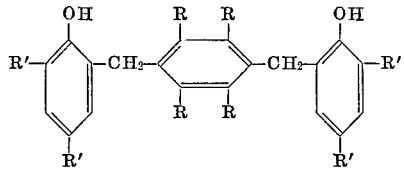

wherein R and R' have the significance noted above. Preferably R is an alkyl group of from 1–4 carbon atoms, and R' is an alkyl group of from 3 to 8 carbon atoms which is branched at the carbon alpha to the ring. Most preferred is where R is a methyl radical and R' is a tertiarybutyl radical. Exemplary of the compounds of this class are 1,4-bis(3,5-dimethyl-4-hydroxybenzyl) tetramethyl benzene; 1,4-bis(3-methyl-5-ethyl-4-hydroxybenzyl) tetraethyl benzene; 1,4-bis(3,5-diisopropyl-4-hydroxybenzyl) tetramethyl benzene; 1,4-bis(3-methyl-5-t-butyl-4-hydroxybenzyl) tetramethyl benzene; 1,4-bis(3,5-dihexyl-4-hydroxybenzyl) tetrapropyl benzene; 1,4-bis(3-t-amyl-5-heptyl-4-hydroxybenzyl) tetrabutyl benzene; and 1,4-bis(3,5-dioctyl-4-hydroxybenzyl) tetrapentyl benzene, as well as their 1,4-bis(3,5-dialkyl-2-hydroxybenzyl) tetraalkyl benzene isomers.

The U.V. absorbing compounds useful in combination with the phenolic antoxidants employed herein are benzotriazole compounds such as N-acylated o-aminophenyl benzotriazole, o-hydroxyphenyl benzotriazole, and derivatives thereof. Other benzotriazoles such as described in U.S. Patent No. 3,004,896 and the like may be used. The preferred compounds are N-acylated derivatives of o-aminophenyl-2,1,3-benzotriazole wherein the carbonyl group of the acyl radical is sterically hindered. Typical of such hindered acyl groups are pivaloyl, 2,2,5,5-tetramethyl adipoyl, 2,6-dimethyl-benzoyl and 2,3,5,6-tetramethyl terephthaloyl. Such compounds may be present as additives or incorporated as an integral part of the polymer molecule through suitable reactive substituents.

The poly(alkylene oxide) compounds employed in this invention are well known for their ability to impart antistatic properties to the filaments. The poly(ethylene oxide) ether glycols having a molecular weight of 600 are suitable. A molecular weight of at least 1000 is particularly suitable. The poly(ethylene oxide) may have as endgroups either one or two alkoxy, aryloxy, or alkyl-substituted aryloxy radicals such as methoxy, ethoxy, phenoxy, nonylphenoxy, 2,6-di-t-butylphenoxy and the like. The latter group is particularly suitable due to its antioxidant effect.

The polycarbonamides comprehended by this invention are synthetic linear polymers characterized by recurring amide linkages as an integral part of the polymer chain. These polycarbonamides may be produced by condensation of monoaminomonocarboxylic acids and their amide-forming derivatives or by the condensation of diamines and dicarboxylic acids or their amide-forming derivatives. Examples of the first group are polycaproamide and polyaminoundecanoamide. Examples of the latter group are poly(hexamethylene adipamide), poly(hexamethylene sebacamide), and polyamides from bis(4-aminocyclohexyl) methane and aliphatic dicarboxylic acids. The polycarbonamides may also contain aromatic ring structures in the polymer chain. Copolycarbonamides and blended polycarbonamide mixtures may also be employed.

The stabilizing additives of this invention may be incorporated into the polymer in any manner. Convenient methods are addition to the polymer raw materials prior to polymerization, addition to polymer flake prior to melt spinning, and injection into the polymer melt prior to spinning into filaments.

The preparation of durably antistatic filaments by melt blending at least 2% of a poly(alkylene oxide) compound with a polycarbonamide prior to forming filaments therefrom is fully described in Belgian Patents 623,762, 623,763 and 631,199. The poly(alkylene oxide) is partially water extractable. After an aqueous scour treatment and partial removal of the poly(alkylene oxide), the polycarbonamide filaments remain antistatic, contain voids, are low density and retain at least about 0.5% of the poly(alkylene oxide).

Analysis of yarns of this invention to determine the permanence of the additives during yarn preparation and processing revealed that the antioxidants are essentially non-fugitive.

For the purpose of this invention the phenolic antioxidant should be present in the filament to the extent of at least about 0.05% by weight. A suitable range is from at least about 0.005% to about 5.0% by weight. Preferably, the phenolic antioxidant content is from about 0.1% to about 3% by weight. The ultraviolet light absorber should be present in the filament to the extent of about 0.1% with a range of from about 0.5% to about 3% by weight being preferred.

The poly(ethylene oxide) should be present to the extent of at least about 2% by weight of the filament. A range of from about 2% to about 30% by weight is preferred, with a range of from about 2% to about 15% by weight being most preferred.

The filaments of this invention may be reproduced in any size or cross-sectional shape. Typical cross-sections are round, trilobal, cruciform and ribbon. They may be used or produced in any state of aggregation, for example, as yarn, staple, tow, fabric, nonwoven structures and the like.

In addition to the additives previously mentioned, the filaments may also contain other suitable delusterants, pigments, ultraviolet absorbers, light and heat stabilizers, dyes and other conventional additives. It may also be desirable to include other polyamide and antioxidants such as those disclosed in U.S. Patent No. 2,981,715; of these, sodium phenylphosphinate is a preferred compound.

What is claimed is:

1. An improvement in the process for producing dyed fibers of a synthetic, linear, fiber-forming polycarbonamide polymer, which process includes polymerizing prepolymer reactants to form the polycarbonamide, melt spinning the polyamide to form filaments, and dyeing the filaments; the improvement for producing dyed fibers having a substantially improved protection against heat and light wherein the improvement comprises adding to the polycarbonamide prior to melt spinning from about 0.05% to about 5% by weight of at least one phenolic compound selected from the class consisting of (a) a 1,3,5-trialkyl - 2,4,6 - tri-(3,5-di-tertiaryalkyl-4-hydroxybenzyl) benzene, and (b) a 2,3,5,6-tetraalkyl-1,4-di-(3,5-di-tertiary-alkyl-4-hydroxy-benzyl) benzene wherein the alkyl groups of (a) and (b) contain up to eight carbon atoms.

2. The process as in claim 1 wherein said phenolic compound is 1,3,5-trimethyl-2,4,6-tri(3,5-di-t-butyl-4-hydroxy-benzyl)benzene.

3. The process as in claim 1 wherein said polycarbonamide polymer contains at least 2% by weight of a poly(ethylene oxide) having a molecular weight of at least 600.

4. The process as in claim 1 wherein the phenolic compound is added to the polymer during polymerization.

5. A stabilized synthetic, linear, fiber-forming polycarbonamide composition having incorporated therein from about 0.05% to about 5% by weight of at least one phenolic compound selected from the class consisting of (a) a 1,3,5-trialkyl-2,4,6-tri-(3,5-di-tertiaryalkyl-4-hydroxybenzyl) benzene, and (b) a 2,3,5,6-tetraalkyl-1,4-di - (3,5 - di-tertiary - alkyl-4-hydroxy-benzyl) benzene wherein the alkyl groups of (a) and (b) contain up to eight carbon atoms, said composition having improved permanency of antioxidant protection against heat and light throughout polymerization, fiber-formation, filament processing and end-use.

6. Claim 5 wherein said phenolic compound is present to the extent of from about 0.1% to about 3% by weight.

7. Claim 5 wherein said composition is in the form of a filament.

8. Claim 5 wherein said phenolic compound is 1,3,5-trimethyl - 2,4,6 - tri(3,5 - di-t-butyl-4-hydroxy-benzyl) benzene.

9. Claim 8 wherein said phenolic compound is present to the extent of from about 0.1% to about 3% by weight.

10. A stabilized, synthetic, linear, fiber-forming polycarbonamide composition having incorporated therein from about 0.05% to about 5% by weight of at least one member selected from the class consisting of (a) a 1,3,5-trialkyl - 2,4,6-tri-(3,5-di-tertiaryalkyl-4-hydroxy-benzyl) benzene, and (b) a 2,3,5,6-tetraalkyl-1,4-di(3,5-tertiaryl-alkyl-4-hydroxy-benzyl) benzene wherein the alkyl groups of (a) and (b) contain up to eight carbon atoms, and at least 2% by weight of a poly(ethylene oxide) having a molecular weight of at least 600, said composition having improved permanency of antioxidant protection against heat and light throughout polymerization, fiber-formation, filament processing and end-use.

11. Claim 10 wherein said phenolic compound is present to the extent of from about 0.1% to about 3% by weight.

12. Claim 10 wherein said composition is in the form of a filament.

13. Claim 10 wherein said phenolic compound is 1,3,5-trimethyl - 2,4,6 - tri(3,5 - di-t-butyl-4-hydroxy-benzyl) benzene.

14. Claim 13 wherein said phenolic compound is present to the extent of from about 0.1% to about 3% by weight.

References Cited

UNITED STATES PATENTS

| 3,004,896 | 10/1961 | Basel | 167—90 |
| 3,026,264 | 3/1962 | Rocklin | 260—45.95 |
| 3,062,895 | 11/1962 | Martin | 260—45.95 |
| 3,438,935 | 4/1969 | Leu | 260—45.95 |

FOREIGN PATENTS 623,762   4/1963   Belgium.

MURRAY TILLMAN, Primary Examiner

P. LIEBERMAN, Assistant Examiner

U.S. Cl. X.R.

260—45.95, 78, 37 45.8, 45.9

PO-1050
(5/69)

UNITED STATES PATENT OFFICE
CERTIFICATE OF CORRECTION

Patent No. U.S. 3,493,633    Dated February 3, 1970

Inventor(s) Ronald Frederick Lange

It is certified that error appears in the above-identified patent and that said Letters Patent are hereby corrected as shown below:

Column 12, Claim 10, lines 30 and 31, "(3,5-tertiaryl-alkyl" should read -- (3,5-di-tertiaryalkyl --

SIGNED AND
SEALED
JUN 23 1970

(SEAL)
Attest:

Edward M. Fletcher, Jr.
Attesting Officer

WILLIAM E. SCHUYLER, JR.
Commissioner of Patents